United States Patent [19]

Thorvaldsen

[11] 4,221,067
[45] Sep. 9, 1980

[54] FISHING IMPLEMENT

[76] Inventor: Sverre Thorvaldsen, Hageveien, Bede, 1700 Sarpsborg, Norway

[21] Appl. No.: 958,683

[22] Filed: Nov. 8, 1978

[30] Foreign Application Priority Data

Nov. 11, 1977 [NO] Norway ............... 773866

[51] Int. Cl.³ ............................................. A01K 91/00
[52] U.S. Cl. ................................. 43/18 R; 43/27.4; 242/84.2 J
[58] Field of Search .................. 43/27.4, 18 R; 242/84.2 J, 96

[56] References Cited

U.S. PATENT DOCUMENTS

| D. 177,000 | 3/1956 | Ayers | 43/27.4 |
|---|---|---|---|
| 1,397,790 | 11/1921 | Tegner | 43/27.4 |
| 1,625,988 | 4/1927 | Dice | 43/18 R |
| 2,684,550 | 7/1954 | Reid | 43/18 R |
| 3,179,351 | 4/1965 | Ehlert | 43/27.4 |
| 3,302,320 | 2/1967 | Breeden | 43/18 R |
| 3,641,695 | 2/1972 | Zenick | 43/19 |
| 3,727,338 | 4/1973 | Pedersen | 43/18 R |
| 3,778,916 | 12/1973 | Wallace | 43/18 R |
| 4,048,743 | 9/1977 | Lapinski | 43/18 R |
| 4,082,235 | 4/1978 | Dauvergne | 43/18 R |

FOREIGN PATENT DOCUMENTS

| 942132 | 9/1948 | France | 43/18 R |
|---|---|---|---|
| 162071 | 2/1958 | Sweden | 43/27.4 |
| 799288 | 8/1958 | United Kingdom | 43/18 R |
| 1252425 | 11/1971 | United Kingdom | 43/18 R |

*Primary Examiner*—Nicholas P. Godici
*Assistant Examiner*—J. T. Zatarga
*Attorney, Agent, or Firm*—Cushman, Darby & Cushman

[57] ABSTRACT

A stationary spool reel having a cylindrical spooling portion at the forward end and a handle at the back. The spooling portion exhibits a forwardly-open cavity, preferably of circular cross section, whose cross-sectional dimensions and configuration are adapted to the external configuration and dimensions of a casting implement, such that the casting implement can be inserted into the cavity and retained therein in an easily detachable manner.

7 Claims, 5 Drawing Figures

FISHING IMPLEMENT

The invention pertains to a fishing implement which comprises a stationary-spool (crankless) reel and a complementary casting implement, such as a float, sinker or the like, where the reel has a cylindrical forward portion onto which the line is wound and a handle at the back.

This type of reel is a simple tool to facilitate the casting of a float, sinker, spinner or the like, and had its origin in an ordinary tin can with a transverse handle attached at the rearward, open end thereof. Such reels later developed into more finished implements. With this type of reel, a heavy spinner, a sinker or a relatively heavy float can be cast surprisingly far. The stationary-spool reel is held with its axis in the direction of the cast, and the line, which is wound around the circumference of the spool transverse to the direction of casting, runs out easily.

The purpose of the present invention is to provide a fishing implement of the above type which forms a compact unit both when being displayed for sale, when stored and when being transported. A further goal is to provide an inexpensive and practical fishing implement which can supplement more expensive casting rods and the like, particularly for the relatively large number of people who do not ordinarily have fishing as a hobby, but who would like to purchase an inexpensive piece of equipment which could more or less be discarded after use. There is a very large market for an inexpensive fishing implement of this type.

The implement proposed to meet these needs is of the type defined introductorily, but is characterized in that the stationary spool onto which the line is would exhibits a forwardly-open cavity, preferably of circular cross section, whose cross-sectional dimensions and configuration are adapted to the external configuration and dimensions of a complementary casting implement, such that the latter can be inserted into the cavity, retained therein, and easily detached therefrom. The various implements can be retained inside the cavity itself or at the opening thereof. In addition, according to the invention the cavity can be provided with internal studs, ribs or the like to facilitate the retention of the casting implements.

A preferred embodiment of the invention is characterized in that the spooling portion of the reel, the handle and any intermediate portion or portions are molded in one piece as a relatively thin-walled body of a suitable material, e.g. thermo-plastic, and that the handle has the form of a rearwardly-projecting hollow stem with a narrowed portion which is adapted for retaining a complementary jig rod or the like.

In accordance with the invention, the reel is provided with a peripheral, radial, external groove, adapted to receive a soft rubber ring for the attachment of hooks. Alternately, this groove can serve to retain a fishing rod which has a holder at one end for attachment in the groove and which is curved such that its forward end lies approximately along an extension of the centerline for the reel.

The invention will be further elucidated with reference to the accompanying drawings, which depict one possible embodiment of the invention.

Figure 1:
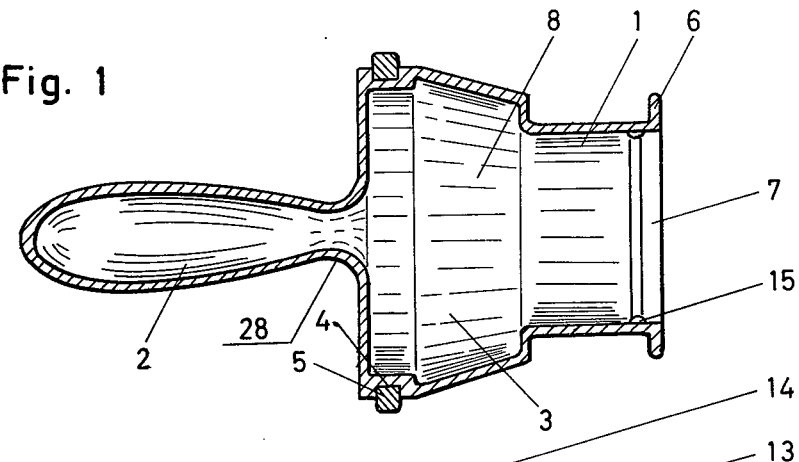
FIG. 1 shows an embodiment of a stationary-spool reel in accordance with the invention, seen from the side and in cross section.

The reel of the invention consists of three main parts: a cylindrical line spooling portion 1 at the front, a handle 2 at the back and an intermediate section 3. These three parts are molded in one piece of plastic such that they constitute a relatively thin-walled body. The reel can be manufactured, for example, by injection-molding of thermoplastic material, or by vacuum- or blow-molding of the same material. If desired, of course, the reel could also be made of some suitable metal. Near the rear edge of the intermediate section, an external groove 4 is provided for a rubber ring. The forward end of the spooling portion 1 has a radially-projecting flange 6.

Figure 2:
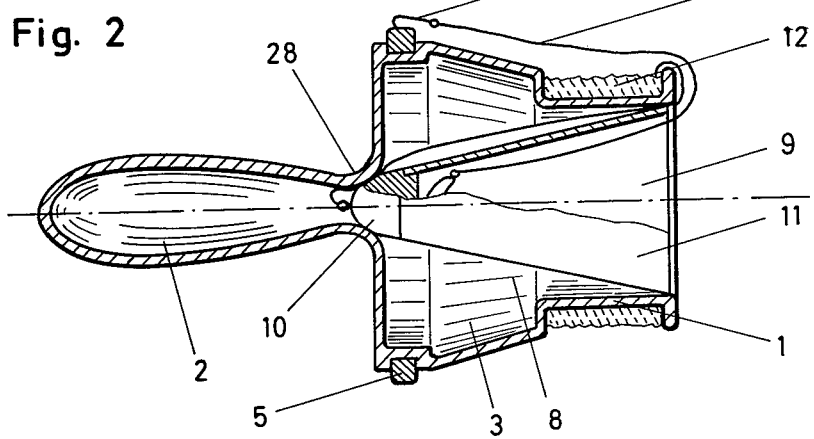
FIG. 2 shows the reel of FIG. 1 with a casting implement inserted therein.

The spooling portion 1 is not closed at the forward end, but has a forwardly-directed opening 7 which provides access to the inner cavity 8 in the reel. Various fishing implements can be inserted into this cavity, as shown, for example, on FIG. 2, where a combined sinker and fly container 9 has been inserted. This implement has a lead head 10 and a funnel-shaped skirt 11. The outer dimensions of the skirt 11 are adapted to the internal dimensions of the spooling portion 1. The length of the implement is adapted such that the lead head 1 rests in the opening to the handle 2 when the edge of the skirt lies within the opening 7. The implement 9 is thereby securely retained in the cavity 8. Fishing line 12 is wound onto the spooling portion 1, the implement 9 is attached to the line, and a snell 13 with a hook 14 runs from the end of the implement 9 to the ring 5, to which the hook is fastened. In this stored position of the implement 9, the snell lies wedged between the edge of the skirt on the implement and the inner surface of the spooling portion. To improve the retention of the skirt edge on the implement in the cavity, a circumferential rib 15, or studs or the like, can be provided on the inner surface of the spooling portion 1.

Figure 3:
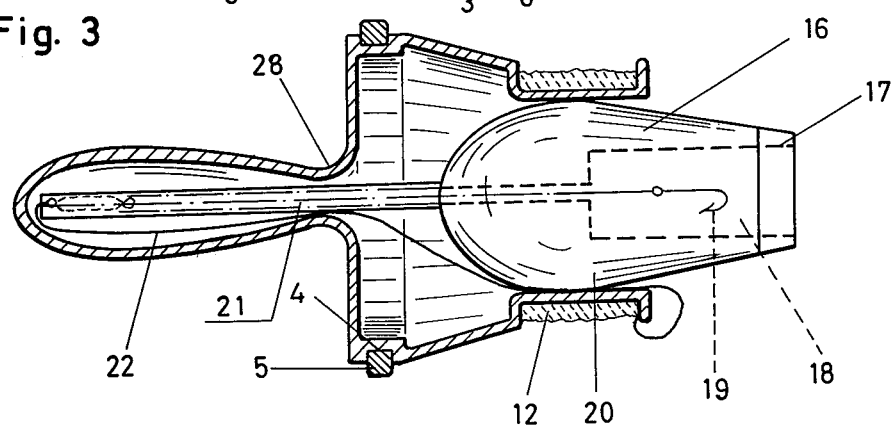
FIG. 3 shows the reel of the invention with a casting bob inserted therein.

On FIG. 3, a casting bob 16 has been inserted into the cavity in the reel, the bob 16 having a forward ring-shaped component 17 made of lead and an internal recess 18 for containing a fishing hook 19. Projecting rearwardly from the float body 20 on the bob is a tubular extension 21 through which a line 22 is threaded and passes between the float and the spooling portion 1 to the line 12 wound around the outside of the spool 1.

Figure 4:
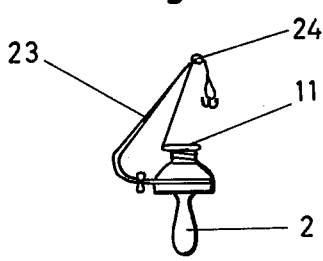
FIG. 4 shows the reel of the invention provided with a casting spinner rod.

On FIG. 4, the rubber ring 5 has been removed, and a casting spinner rod 23 has instead been set into the groove 4 and fastened in an appropriate manner. The fishing rod 23 is curved such that the end ring 24 lies approximately on a line with a central plane through the spooling portion 1 on the reel. This curvature permits the line to leave the reel unhindered during a cast and to be freely rewound onto the spooling portion 1 by hand.

Figure 5:
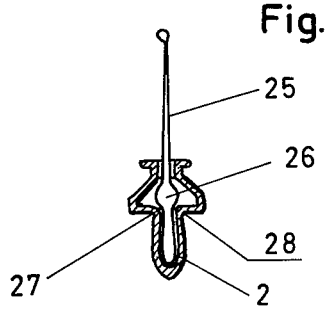
FIG. 5 shows the reel of the invention provided with a jig rod.

FIG. 5 shows an embodiment in which a jig rod 25 has been inserted into the hollow cavity in the reel. The jig has a handle 26 with a narrowed portion 27 which engages with the narrowed portion 28 inside the handle 2.

As can be seen on FIGS. 2, 3, 4 and 5, the reel together with a casting implement 9 or 16, or with a spinner rod 23 or jig rod 25, complete with hook, line sinker and the like, forms a compact unit, ready for sale and for use. One can thus go into a shop and purchase complete fishing equipment at a modest price. The embodiment examples shows on FIGS. 2 and 3 in particular require very little space, e.g., when travelling, and one could even have such an implement permanently on hand in the car, readily available if one should happen upon a promising body of water and feel like trying his luck.

Having described my invention, I claim:

1. A casting reel comprising a hollow body having a longitudinal axis and a forward end, said body being circular in transverse cross-section and having an axially facing opening at its forward end for receiving a fishing line, said body having a spooling portion at said forward end, said spooling portion having an external cylindrical surface coaxial with said longitudinal axis, around which a fishing line may be wound and said spooling portion terminating at the forward end of said reel in a radially outwardly projecting flange which circumscribes said axially facing opening, said body having an intermediate portion axially adjacent said spooling portion, said intermediate portion having an external conical surface tapering outwardly and rearwardly, the axial length of said conical portion being approximately the same as the axial length of said cylindrical portion, an elongated handle extending from the rear end of said body, said handle being coaxial with said body and of lesser cross-section than said body.

2. A reel as in claim 1 wherein the diameter of said conical portion at its smallest end is greater than the diameter of said cylindrical portion so that there is a step between said conical portion and said cylindrical portion.

3. An arrangement on a casting reel for spinners, bobs or the like, intended to be held in one hand of the user during the cast, said reel having a forward, cylindrical spooling portion open at the front for receiving a fishing implement into an internal cavity and a handle at the back, the cylindrical spooling portion being defined in the axial direction by annular flanges disposed perpendicularly to the axial direction of the spooling portion, characterized in that the rearward annular flange which defines the spooling portion is connected to a rearwardly-extending conical section whose diameter increases toward the rear, and that the conical section is approximately of the same length as the cylindrical spooling portion.

4. A fishing implement according to claim 3, characterized in that studs, ribs or the like are provided on the inner surface of the cavity to facilitate retention of the fishing implement.

5. A fishing implement according to claim 3 moulded in one piece as a thin-walled hollow body of thermoplastic material, and the handle having the form of a rearwardly projecting, hollow stem with a narrowed portion adapted to retain a complementary jig rod or the like.

6. A fishing implement according to claim 1, characterized in that the reel is provided with a circumferential, external groove, adapted to contain a soft rubber ring for the attachment of hooks.

7. A fishing implement according to claim 6, characterized in that the groove can alternately serve to hold a fishing rod which can be attached in the groove and which is curved such that its forward end (the end ring) is approximately aligned with an extension of the centerline of the reel.

* * * * *